US007006664B2

(12) United States Patent
Paraskevakos

(10) Patent No.: US 7,006,664 B2
(45) Date of Patent: Feb. 28, 2006

(54) INTELLIGENT CURRENCY VALIDATION NETWORK

(76) Inventor: Theodore George Paraskevakos, 91 Aspasias Street, Holargos, Attica (GR) 15561

( * ) Notice: Subject to any disclaimer, the term of this patent is extended or adjusted under 35 U.S.C. 154(b) by 29 days.

(21) Appl. No.: 10/740,587

(22) Filed: Dec. 22, 2003

(65) Prior Publication Data

US 2004/0131230 A1 Jul. 8, 2004

Related U.S. Application Data

(63) Continuation of application No. 09/508,924, filed as application No. PCT/GR99/00026 on Jul. 20, 1999, now abandoned.

(30) Foreign Application Priority Data

Jul. 22, 1998 (GR) ................................ 980100290

(51) Int. Cl.
*G06K 9/00* (2006.01)

(52) U.S. Cl. ....................................... 382/100; 382/140

(58) Field of Classification Search ................ 382/100, 382/135, 137, 139, 140, 232; 379/49; 902/4, 902/5, 6, 7, 28; 340/568.7; 250/559.44; 700/116; 235/380, 382.5; 380/276; 359/2; 713/176; 283/72, 74, 81; 705/57, 58
See application file for complete search history.

(56) References Cited

U.S. PATENT DOCUMENTS

| | | | | |
|---|---|---|---|---|
| 4,814,589 | A | 3/1989 | Storch et al. | |
| 4,949,256 | A | 8/1990 | Humble | |
| 5,039,020 | A | 8/1991 | Leuthold et al. | |
| 5,283,422 | A | 2/1994 | Storch et al. | |
| 5,469,241 | A | 11/1995 | Takahashi et al. | |
| 5,478,992 | A | 12/1995 | Hamada et al. | |
| 5,607,040 | A | 3/1997 | Mathurin, Sr. | |
| 5,671,282 | A | 9/1997 | Wolff et al. | |
| 5,675,662 | A * | 10/1997 | Deaton et al. | 382/137 |
| 5,890,141 | A | 3/1999 | Carney et al. | |
| 6,014,644 | A * | 1/2000 | Erickson | 705/37 |
| 6,065,672 | A | 5/2000 | Haycock | |
| 6,131,718 | A | 10/2000 | Witschorik | |
| 6,141,438 | A | 10/2000 | Blanchester | |
| 6,363,164 | B1 | 3/2002 | Jones et al. | |
| 6,385,352 | B1 | 5/2002 | Roustaei | |
| 6,535,638 | B1 * | 3/2003 | McGrew | 382/210 |
| 6,550,671 | B1 | 4/2003 | Brown et al. | |
| 6,661,910 | B1 * | 12/2003 | Jones et al. | 382/135 |
| 2002/0069220 | A1 * | 6/2002 | Tran | 707/503 |

FOREIGN PATENT DOCUMENTS

| | | |
|---|---|---|
| FR | 2 539 898 | 7/1984 |
| WO | WO 9811774 | 3/1998 |

* cited by examiner

*Primary Examiner*—Joseph Mancuso
*Assistant Examiner*—Shefali Patel
(74) *Attorney, Agent, or Firm*—Drinker Biddle & Reath LLP

(57) ABSTRACT

A method for an intelligent identification system to recognize and validate currency base in the uniqueness of their numbers by employing video scanning apparatus in conjunction with optical character recognition (OCR) software and broadcasting capabilities so it can recognize the currency's value from a digitized serial number, store it with or without a "tag", by memory means and be able to transmit and receive additional lists as a part of a network and as an extension; to recognize foreign countries currency, bank checks, personal checks and bills to be paid, for example: telephone bills, utility bills, etc.

22 Claims, 9 Drawing Sheets

INTELLIGENT CURRENCY VALIDATION NETWORK

This application is related and claims priority under 35 U.S.C. §119 to Greek Patent Application No. 980100290, filed Jul. 22, 1998, the entire contents of which are incorporated by reference herein. In addition, this application is a continuation of U.S. patent application Ser. No. 09/508,924 filed on Mar. 17, 2000, now abandoned, which is a 371 of PCT/GR99/00026, filed on Jul. 20, 1999, upon which Applicants rely for the benefits provided in 35 U.S.C. §120, the entire contents of which are incorporated by reference herein.

BACKGROUND OF THE INVENTION

Since the creation of paper money, the "war" against counterfeiting has been assigned to very able persons and very capable service departments with all the latest state of the art technology and facilities at their disposal. Counterfeiting has stopped to a large degree, especially from amateur and unorganized counterfeiters.

Although it is not possible to have detailed statistics in the subject concerning counterfeiting and especially in cases of very good quality "fake money" which can pass mostly undetected. In addition, the technology has favored the side of the perpetrators, who have the latest equipment such as scanners, color laser printers and image processing through PCs.

This unfair "war" becomes worse if we assume that counterfeiting can be done by "organized" perpetrators such as extreme groups (but not impossible), an enemy county that desires to damage the economy of their enemy, or even more bazaar (but also not impossible), the country itself in an economical desperation decides to print money with identical serial numbers. Obviously these scenarios are very difficult to follow because, especially in the second case, the control of the currency printing is made by many honest men with integrity and several departments which are staffed with able men. But in every case they remain "men".

On the other hand, even if we maliciously suppose that the above scenario had been done, nobody would ever be able to prove the counterfeiting existed because the bills were "authentic" and "perfect" that because the "organized" perpetrators had used the same paper, the same printing device, the same ink and technology.

More than that, it is obvious that no government would admit to counterfeiting with the consequence of seeing their economy collapsed.

There is nothing that the organized counterfeiters can not do, except of course from inventing new serial numbers.

They are always forced to use the same serial numbers several times.

SUMMARY OF THE INVENTION

The proposed method is based upon a very simple principal, that paper money always carries a "name" that is its serial number, which the technology used so far did not have the ability to exploit. The proposed invention recognizes money's name so it brings money out of its "anonymity".

The present invention can work with other existing systems and can be worked in conjunction with currency counting devices, (in which we can add a special printer which can print the numbers of the currency on the securing tape of the bundle so the cashier cannot replace the money with the fake ones, something which could be done in the past). Other devices include drawerless cash registers (DCR), with automatic tellers (ATM), a local currency to Euro exchange machines, with machines accepting utility bills (UBPM), pay bill machines and money/check/credit vending machines (VM), which is, itself, an extension of my Video Vending Machine, already patented under U.S. Pat. No. 4,858,749 on Aug. 22, 1989 in USA. And other machines and devices are also included as we reveal next.

The main component of the system consists of an image recognition system, which includes but is not limited to, a Couple Charge Device (CCD) similar to ones readily found in the markets known as "scanners" for transferring pictures and images to a personal computer (PC). This "scanner" can also employ Optical Character Recognition (OCR) software, which specifically recognizes the currency's denomination and can screen the currency by denomination numbers. It also can recognize and store digitally the serial number of the currency. Also, the software can have an element (ICON) which depicts the entire surface of the paper currency which can be either both sides or select portions of the paper currency and since the "scanner's" software has the ability to magnify the image in very small specific details which can be compared to identify information in the existing currency which is virtually unseen by the naked eye.

Such details are well known to government bodies and agencies issuing currencies around the world.

The optical character recognition software of the system can be used to compare denomination numbers, serial numbers, left and right series numbers, printing numbers, issuing bank numbers, date of printing, treasury and secretary signatures, or any other number, letter or icon, to help verify the authenticity of the currency. We can also add an electronic ID (TAG) for every passing bill which can identify the country, the time, the special place where the transaction occurred, and any other information that the authorities find appropriate and useful, such as if this specific bill was a part of a bigger amount or if it was passed alone.

This system also employs ultra-violet light to detect ink color and paper quality and with the appropriate back lighting can recognize watermarks. Also, with the use of a magnetometer, we can detect metallic lines (wires) imbedded between the paper layers and from its magnetic properties to discern between a metallic element and an ink line usually used by unsophisticated counterfeiters. We also can read magnetic inks.

The ability of the system and its software to digitize and recognize serial numbers gives this approach the most intelligent use, since the serial numbers of the currency can be compared in the system's memory with an existing list, supplied by the country's treasury or appropriate department, of available serial numbers for that particular denomination and/or issuing date. So the system can determine the denomination by existence of that serial number on the supplied list.

The system can compare the under-investigation currency with a list of serial numbers representing stolen numbers, fraudulently obtained numbers, serial numbers used by special agencies, for example narcotic agencies, to trace the path of currency recipients from the result of a "sting" or surveillance activity, a list of destroyed money by the treasury department due to age, being voided or canceled, or other reasons and determine if those moneys "avoid" the distraction.

It is obvious to those in the art that many scenarios of information can be created, in which instruct machine's operators to undertake one scheduled action or the system could make an action automatically, for example to automatically point a hidden camera to photograph the person dispersing the money and especially when it concerns for an automatic banking machine (ATM) to prompt the patron to push a specific button, where behind the button, a special camera is installed so that it records one part of the patron's fingerprint and to go forward to other activities that have been pre-programmed.

The information about the numbers could be given into the system whether by hardware means, e.g. ROM, PROM, EPROM or with any other magnetic or optical mean for example hard disk, soft disk, CDROM.

The lists could be transferred bi-directionally through a modem and a telephone line or cable TV, satellite communication, radio, Network P/C or any another communication system that will be chosen, present or future one.

The system has the ability to store locally the number of scanned currency in optical, magnetic or any other means existing or use it in the future. If the system is installed in a bank or a super market or any other money dealing establishment, the numbers from all the incoming bills will be stored and can be transmitted through the communication link to the proper authority in a predetermined time or in case of an unlawful action (such as a robbery) the numbers of the bills transmitted to the central processing authority which can transmit the above numbers of the bills to the rest of the notes of the network such as a "black" list so the notes can take an action according to the program.

That way the stolen money will be rendered "unusefull" to perpetrators, because they can be identified and that can lead to their apprehension.

It is obvious to those in the art that the connection from and to the Central processing unit has to be protected by some means of cryptographic skims available in the market or one similar to the one I describe in great detail in my US patents (APPARATUS AND METHOD FOR REMOTE SENSOR MONITORING, METERING AND CONTROL.) U.S. Pat. No. 4,241,237 Dec. 23, 1980 and U.S. Pat. No. 4,455,453 Jan. 19, 1984.

Furthermore, with the use of the 'black' lists, society can benefit financially and socially. This could impose difficulties to drug distribution, money laundering from drugs and blackmailing. Also, it could help the prevention of tax evasion.

The installation of the network can be structured as a 'Pyramid', in this way the top of the Pyramid is the Central Bank with the control services of counterfeiting, which can compare up all the numbers regularly for duplicate numbers and compare them in order to find double numbers. This central service is connected with a lower level which can be the banks of its particular country in Europe if the system is installed in the European Union.

These E. U. central banks take their information from the other bank's branches, which function in their countries.

The central banks of each country could be contacted immediately or through the branches with the units that exchange money, like Public Funds, Booking Office, Post Offices, Airports, Department Stores, casinos, entertainment centers and generally anywhere seen appropriate.

The birth of EURO is an ideal timing to create and establish a system such as the proposed one because a huge number of cash registers would have to be changed. That gives the opportunity of businesses to choose cash registers with the proposed system retrofitted thereto.

The participating country members have a lot to gain from the system since from one hand it will minimize the losses from the counterfeiting and as a by product will impose great difficulties in drug trafficking, money laundering, robberies, blackmailing, tax evasion etc.

On the other hand the system will create job positions for the operators of the system and for the manufacturing and maintenance.

DETAILED DESCRIPTION OF THE INVENTION

Figure 1:
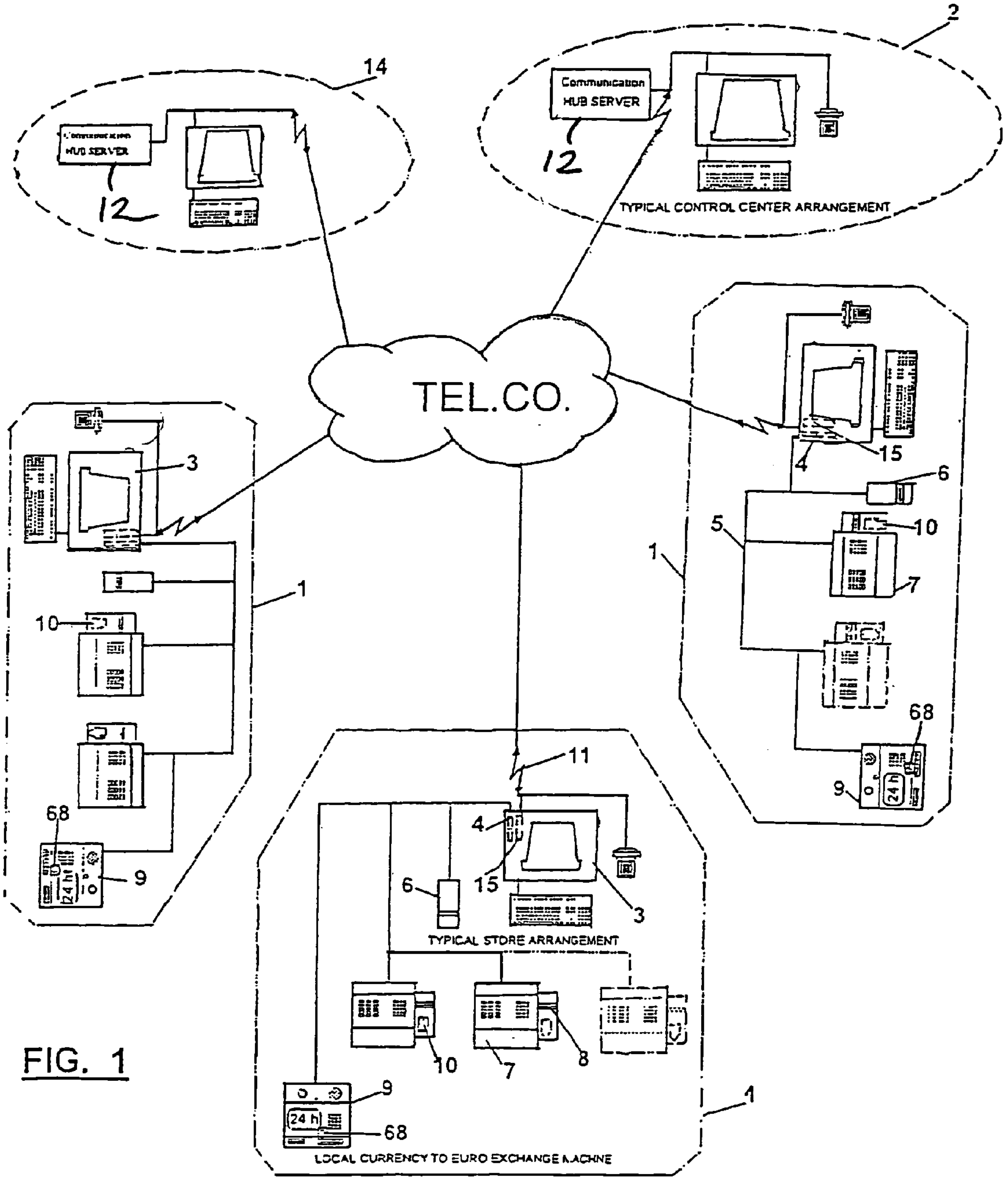
FIG. 1 is a typical diagram of the main components connected as a network of the system.

FIG. 1 shows a typical network that validates the authenticity of the paper-money consisted of several local Typical Store Arrangements (1) which are connected with a mobile or dial-up telephone line as a network with a Typical Central Unit (2).

Each Typical Store Arrangement (1) in this exemplary embodiment consists of one local CPU (3) which has a resident LAN Card (4) connected with a twisted pair or coaxial (5) wires with the reading and authenticating currency devices (6) which are connected with money collecting devices, such as cash registers (7).

The devices (6) carry internally the video cameras (10) and the currency input (8). The system, depending on its use, can be connected with one or more Euro to Local Currency Exchange Machines (9). The CPU (3) is connected internally or externally with a MODEM (15) which is connected with a telephone line or with any other means to connect the system with a Central Office/Processing Unit (2).

The Central Office/Processing Unit (2) consists of a communication HUB SERVER (12) which is connected with the local CPU (3) and with a printer. The HUB server (12) is connected through the telephone network with the higher level Centers (14) which in turn are connected to the higher level Central Office/Processing Units (2) or even the pick of the Pyramid.

A typical operation of the system is: The cashier of the store no matter whether that is a bank or a super market or anything else, receives the money from the patron and places it in the money input (8) so the serial numbers of the currency can be read. The digitized numbers through the lines (5) and the LAN card (4) are stored in the memory of the CPU (3).

If the client self served, the same procedure will be followed so the CPU (3) can determine if the currency's serial numbers are valid.

In pre-determined time intervals, the CPU (3) will communicate with the local HUB SERVER (12) and will send all the stored numbers. If during the operation the CPU (3) discovers the same number more than once, which one of them is probable in the cashiers hands and the other is perhaps in the memory, the system will trigger the proper program and according to that will record the picture of the patron and will send instructions to the cashier and the rest of the authorized personal. Next, the picture of the patron is saved along with other data (see FIG. 9), which data is transmitted to the Central Office/Processing Unit (2) for further action.

Something similar will happen if the CPU (3) determines the under investigation number belongs to a "list" which can be stolen money, money from drug traffic etc.

In a case of an armed robbery, the cashier will be forced to surrender the money to the perpetrator. Soon after the perpetrator leaves, the CPU (3) will transmit all the numbers of the stolen money to HUB SERVER (12). The HUB SERVER (12) will transmit in all the CPUs in his sprockets and all the Central Office/Processing Unit (14) of higher level the numbers of the stolen currency in a form of a "black list" so when the currency appears, the system will record the picture of the user and follow the appropriate action plan. The same procedure will be followed if the money comes from a "sting" operation such as narcotics surveillance which appears in a "red list" and the employees will follow the appropriate programs.

Figure 2:
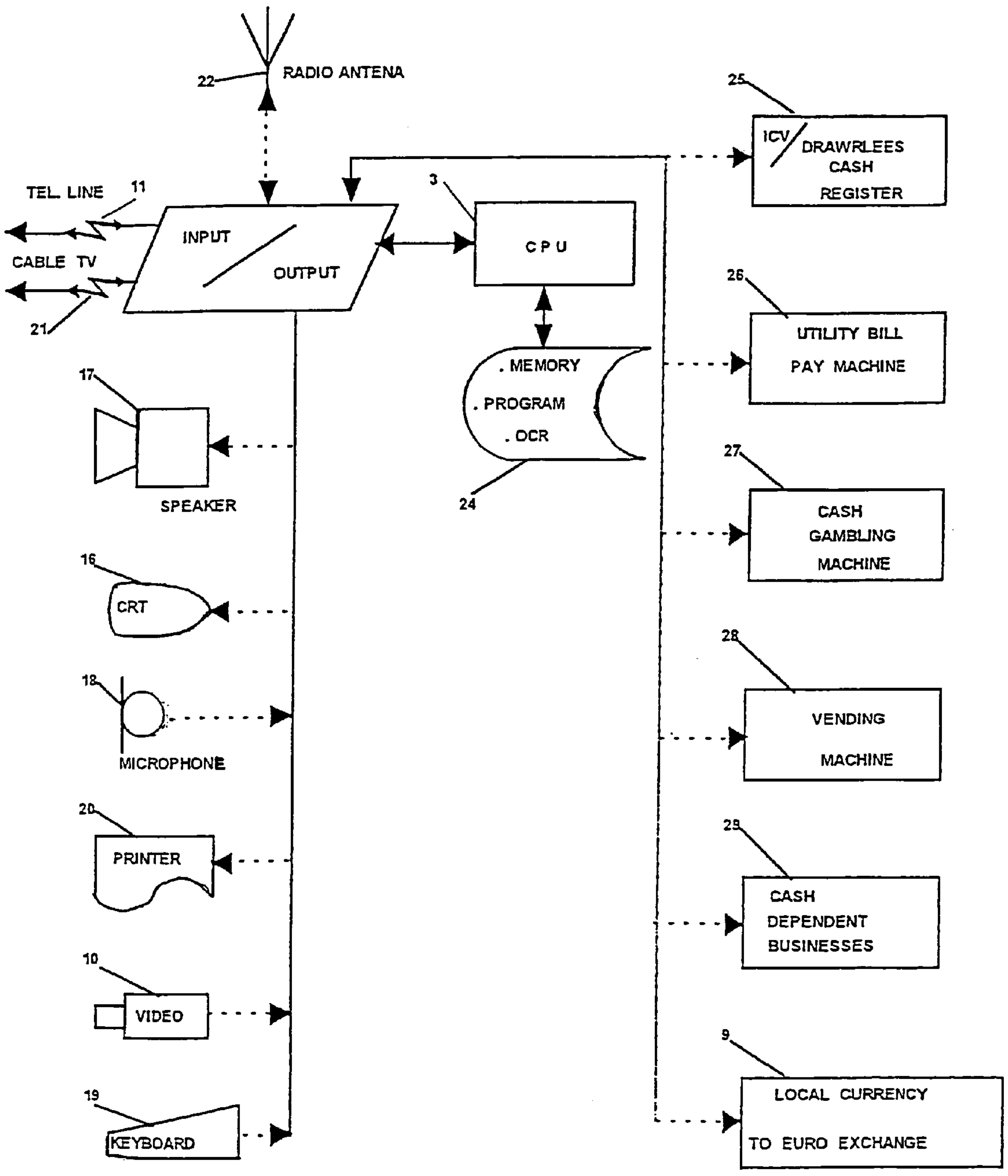
FIG. 2 is an overall block diagram of an exemplary embodiment of this invention.

FIG. 2 illustrates an overall block diagram of an exemplary embodiment of the system. At the left site shows the customer interfaces means which can include but is not limited to: a CRT monitor (16) for the operator, a loudspeaker (17), a microphone (18), a video camera (10) a keyboard (19) and a printer (20) for hard copies of receipts.

It shows also the more common communications links such as: telephone line (11), cable TV (21), AM-FM radio-satellite reception antenna (22). Many other existing bi-directional communications links can be used or even same future ones.

The input/output devices are connected bi-directionally with the intelligent currency validators and other applicable devices such as:

1) Drawerless Cash Register (25).
2) Utility bill pay machine (UBPM) (26) in which the patron inserts in an appropriate entrance slot the bill to be paid. The system recognizes the bill and the amount to be paid and instructs the patron to insert the paper currency in the proper money entrance and then after determines the authenticity of the currency to stamp the bill as a "paid". For example, such a system may include logic program means to read and recognize utility bills, and logic means to recognize bills to be paid and for paying the bills.
3) Cash Gambling Machines (CGM) (27) which can be retrofitted to the exiting machines dispensing LOTTO, PROTO, XISTO, Pick Five etc, and sell any other lottery tickets desired.
4) Vending Machines (VM) (28). Such as machine vending video tapes like the one which I invented and for that reason I developed the present system.
5) Cash Dependent Businesses (29). Casinos, banks savings and loans and any other business which can handle large amounts of money will benefit from the installation of the proposed system which not only the business from counterfeit losses but from armed robberies too.
6) Local Currency to Euro Exchange Machine (9). In which the patrons will exchange the local currency to a new Euro, in the operation explained later.

Figure 3:
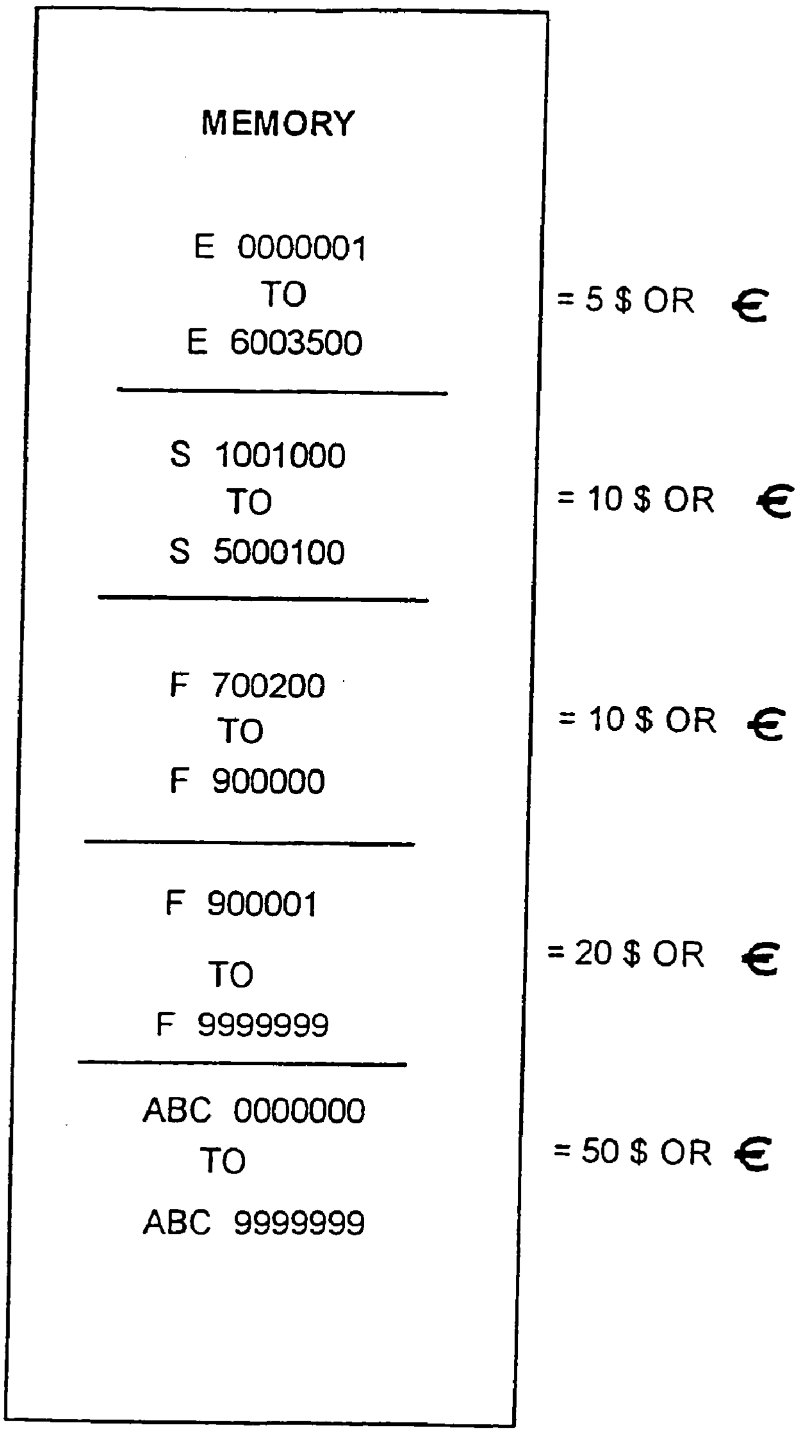
FIG. 3 is an exemplary embodiment of a memory's allocation structure.

FIG. 3 shows an exemplary embodiment of a memory's allocation structure where the system's memory can be typically arranged as shown in the figure. In particular, in one position of the memory, (address) will be place the beginning of the issuing serial numbers and in other position (address) the end of the issuing numbers. In another address we can place the face value of its currency e.g. 5 EURO. The same logic will follow for the 10, 20, 100 etc EURO or any other participating currency.

Between the beginning and the end of each issuing lot will be placed all the numbers which are unacceptable e.g. numbers which are canceled due to overuse, being destroyed or belonging to certain "lists". That way we limit the use of the available memory as much as possible, obviously we can use any commercial memory surprensing software available in the market.

Figure 4:
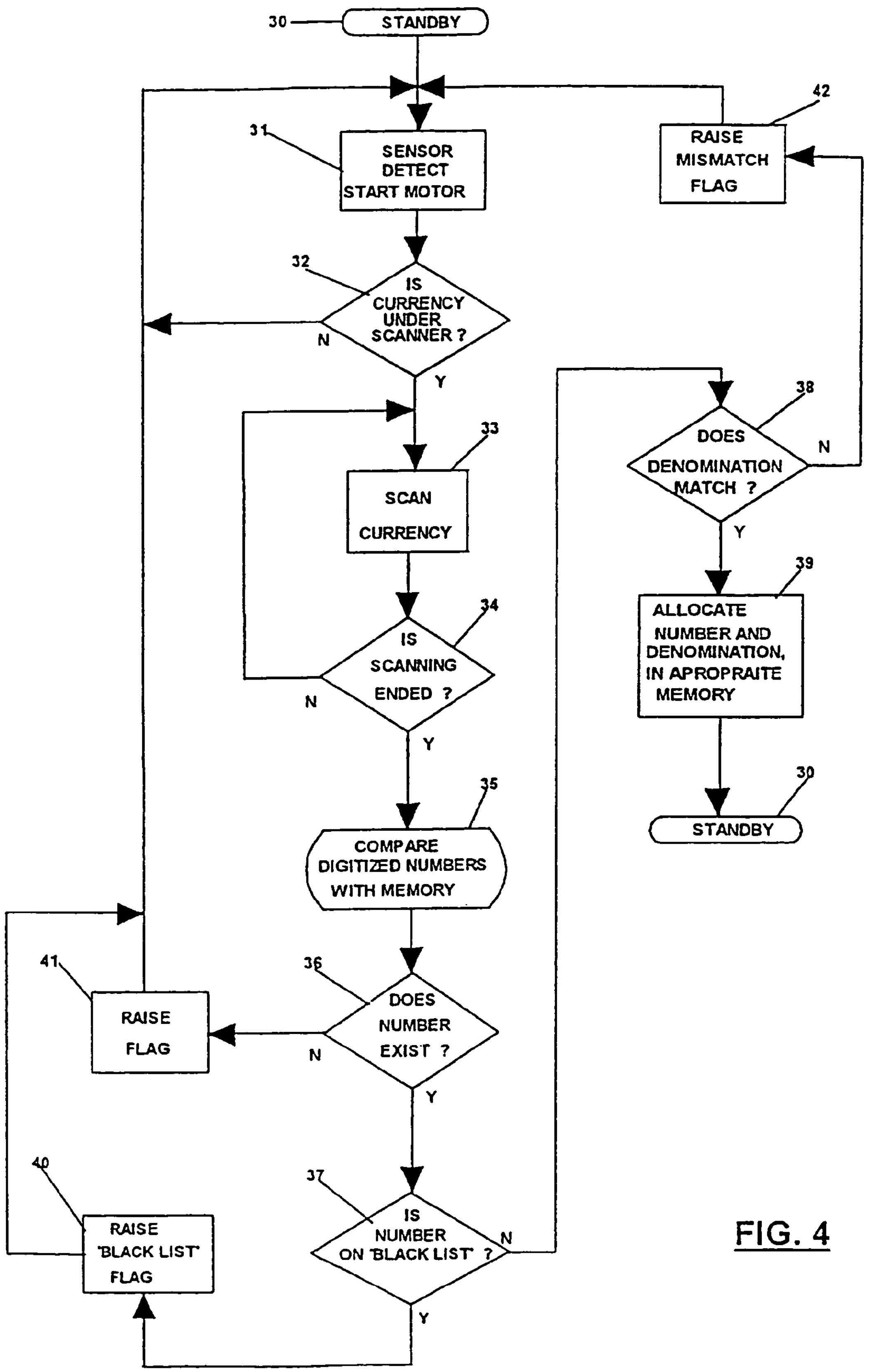
FIG. 4 is an exemplary embodiment of logic flow diagram for the system's software.

FIG. 4 is an exemplary embodiment of a typical logic flow diagram. In this script, the system initially will remain in a standby condition (30). When the entrance sensor (31) triggers, an order is given to start the paper money entrance motor (33). As soon as the currency passes under the scanner (32), the reading of the currency (33) occurs. When the reading is over (34), the number is compared with that in memory (35) and if the number's parameters exists (36), the number is searched in a potential 'black' list (37) and if it is not in the list then the currency's denomination value (38) is compared and the number of the paper money and its value is put in the suitable memory (39) and goes back in a standby (30) state.

If something doesn't go right like the number of the paper money is in a 'list' then a 'flag' (40) is raised and goes back to the start point (30).

The same will happen in case that the number isn't in the memory (41) or a difference is found between the numbers (42) or any other problem appears to the program, it will trigger the suitable subroutine to take the proper action.

Figure 5:
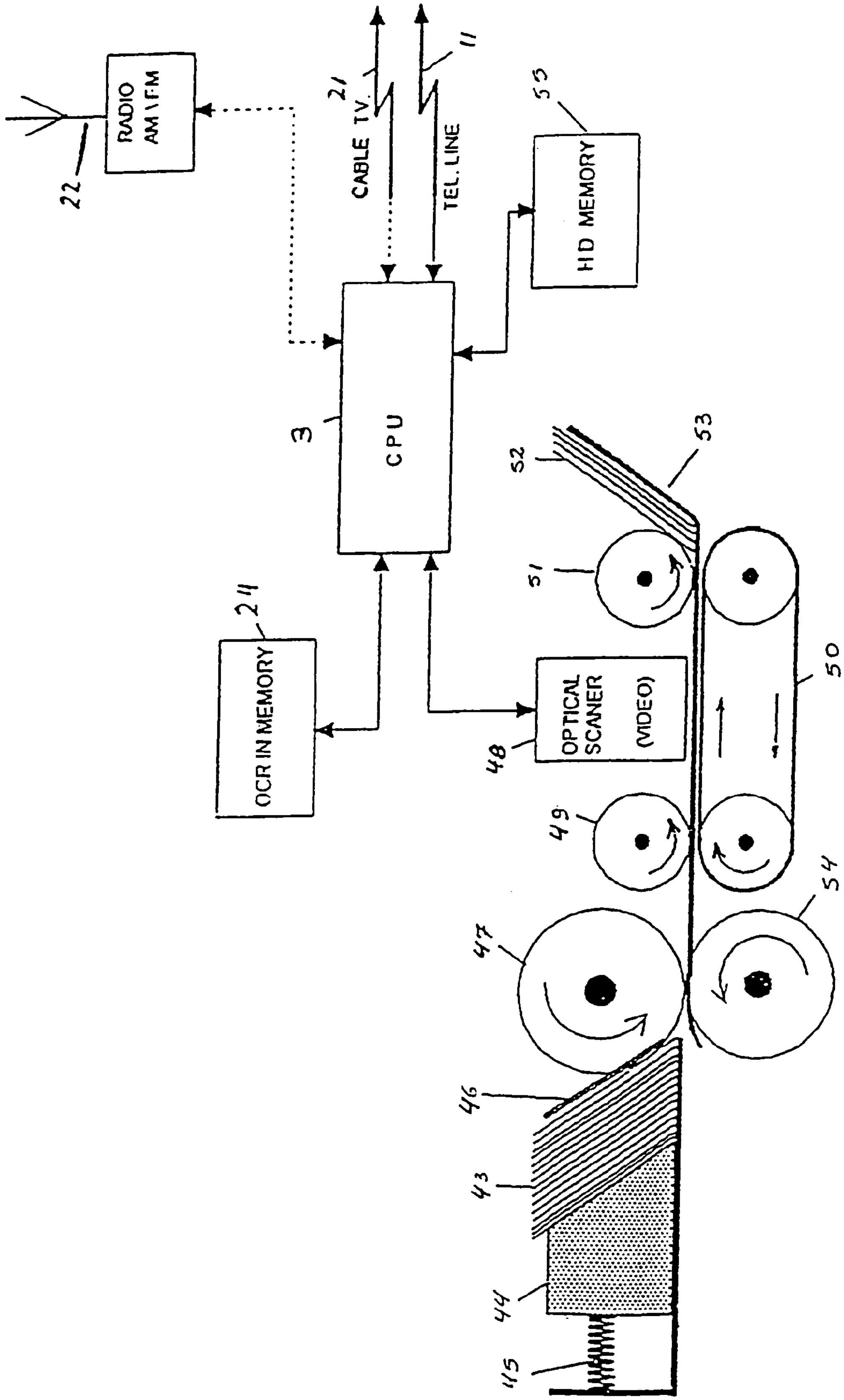
FIG. 5 is an exemplary embodiment of block diagram of a typical system.

FIG. 5 shows a conceptual illustration of an exemplary embodiment of a typical block diagram of an intelligent currency validator system in which the currency (43) is appropriately placed by the operator into the currency input, consisting of a retainer plate (46) and a spring (45) loaded pressure plate (44). Upon the detection of the presence of the currency through the appropriate sensors, the intake wheel (47) moves the first bill of the stacked currency (43) to the appropriate rollers (49) assisted by the belt system (50). The counter-direction ruffle cylinder (54) acts as a deterrent of the second bill to be inserted into the mechanism, allowing only the top bill of the stack to go through the optical scanner (48) which contains its own light source. The image (picture) from optical scanner (48) is transferred to the CPU (3). The CPU (3) upon processing the image with the help of the OCR program in memory (24) can compare the serial number from the scanner to the available serial numbers of memory (55). Upon successful comparison the CPU (3) issues a command to store that successful transaction into the memory (55), until transfer by the communication link to a Central Office/Processing Unit.

Figure 6:
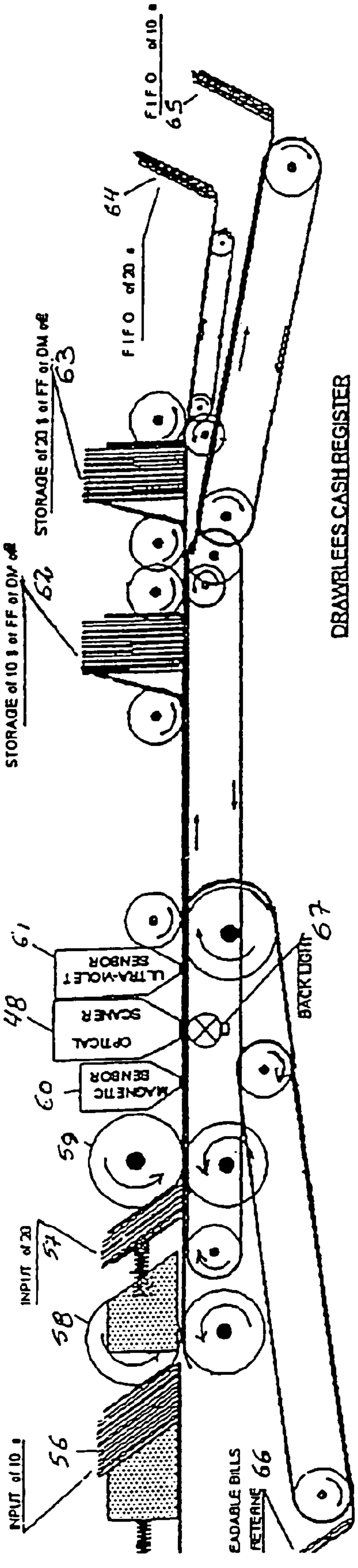
FIG. 6 is a conceptual illustration of a Drawerless Cash Register.

FIG. 6 is a conceptual illustration a drawerless cash register (25) application. More specifically, the currency entry ports in the OCR will allow the cashier to place a stack of currency (56) and (57) in the system according to their denomination. The currency is advanced forward by the rubber wheels (58) and (59) and forced to pass under the magnetic sensor (60), the optical scanner (48) and the ultra-violet tube (61). As soon as the currency proves authentic, the system puts them in the money stocks (62) and (63) according to their denomination. It is obvious that the system has more than two money stocks and as many as necessary but for the simplicity of the present description we have omitted. The system also has a provision to return the change to the customer (64), (65) in a such a way that the cashiers do not have to open and close drawers and the machine manages the money automatically and safely.

During the authentication procedure and as soon as the money is verified, the systems store their serial numbers otherwise return it to the exit (66) as unacceptable.

In the procedure of returning the change to the patron, the system returns the first receiving money in a fashion (FIFO) first in first out. That way, the system knows every time what money comes in and what goes out for added security in case of the money being removed by force or illegally.

Obviously the system can employ a backlight bulb (67) to read the watermark in the currency.

Figure 7:
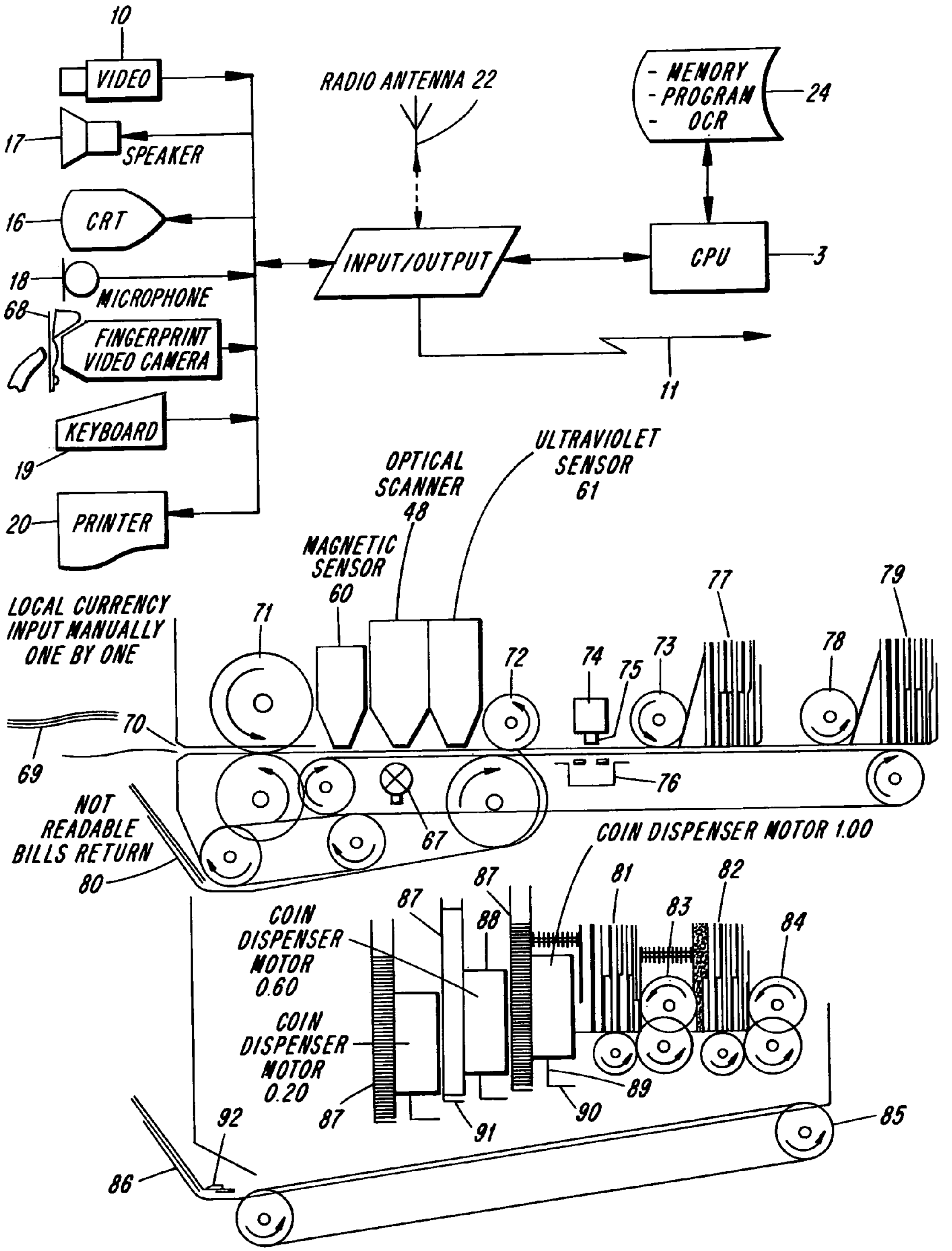
FIG. 7 is a conceptual illustration of a Local Currency to Euro Exchange Machine.

FIG. 7 is a conceptual illustration of an exemplary embodiment of a typical Local Currency to Euro Exchange Machine. On the left side there appears the customer interface which consists of a video camera (10), loud speaker (17), CRT (16), a keyboard (19), microphone (18), output of printer (20) and a special key for the fingerprint reception (68).

In the face of this conceptual embodiment, we have conveniently placed the money entrance (70), the money exit (80) and the port receiving EURO (86), which is also the port receiving the euro coins (92).

As soon as the patron presses the start button (68), the CPU instructs him through the display (16) and the loud speaker for the further steps. The patron will place his local currency in the entrance (70) and through the wheel (71), they will advance and pass under the magnetic sensor (60), the optical scanner (48), the U/V tube (61), the watermarks tube (67) and if they approve authenticity as we explain earlier, the wheel (72) forwards the currency to the wheels (73) and (78), and will store the local currency in the storing stocks (77) and (79) accordingly. In the mean time, the CPU instructs the solenoid (74) through the perforating tool (75) to open a hole in the local currency to render them useless. The discarded piece of the currency will be collected from the collection bucket (76).

It is obvious that the perforation of the currency can be of a different shape for each machine so that it can be recognized easily.

The remaining currency can be stored in lower security environment until it is destroyed totally or it may be kept for any other use.

The unaccepted currency will be returned to the patron through the port (80) alone with instructions through the display (16) and the speaker (17). If something goes wrong with the patron's currency, the system will record the picture of the patron and ask him to press the button (68) which this time will be trigger the switch (95) (FIG. 8) to start the video camera (96) to record a part of his fingerprint. This fingerprint will be incorporated in the video screen (98) (FIG. 9).

As a part of the program, the system will also ask the customer if he prefers the return of the non-authenticated currency now, or he can provide additional information through the keyboard (19) so the system can credit his account as soon as the manual authentication takes place.

Figure 9:
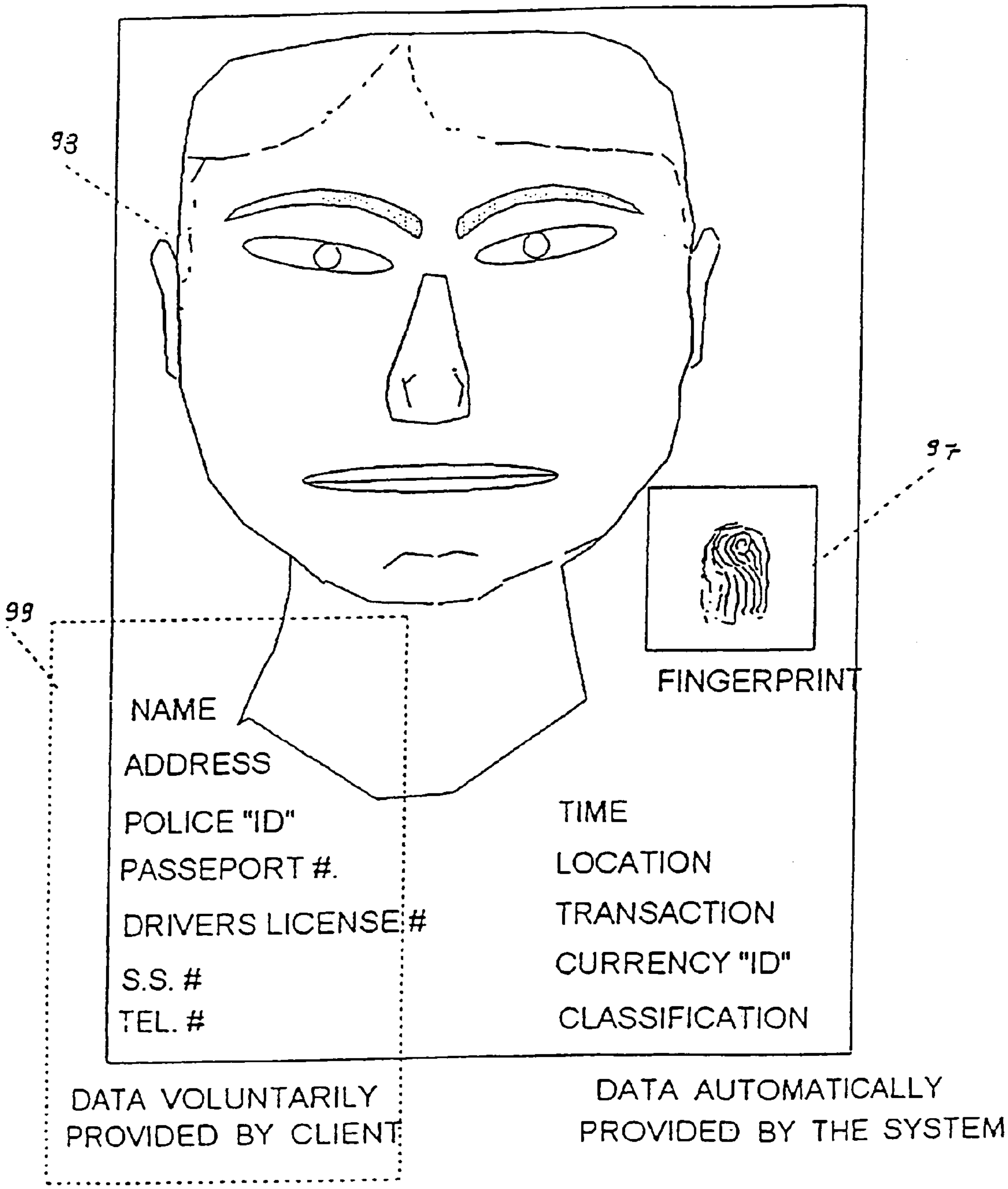
FIG. 9 is a conceptual illustration of a proposed video screen scenario.

The data provided by the patron through the keyboard (19) will appear in the screen (98) alone with the data provided automatically by the system (FIG. 9).

All the data which appears in FIG. 9 will be stored and transmitted accordingly. If the patron provides the wrong data or flees the scene, this will perhaps indicate his guilt and the system will follow a Program to notify the proper authorities.

It is obvious to those in the art the programs which we employ can be more or less rigid, that means the video camera (10) can analyze the picture and determine if the print is from a human figure or the patron is wearing a glove, also can analyze and determine if the face of the patron is real life or is covered by same means.

After the authentication, perforation and storage of the local currency, the system will dispense the appropriate amount of euro from the stocks (81) and (82) through the rubber wheels (83) and (84) will advance the money in to the belt (85) which will forward the currency into the exit (86), as shown in FIG. 7.

Obviously the system can and will incorporate the coin stocks (87) which with the help of the coin dispensing motor (88) will dispense the coins, for each full turn of the motor's (88) axle (89), the bracket (90) will dispense through the slot (91) a single coin, which moves along the belt (85) and then in the position (92) ready for the patron to collect.

It is obvious for simplification reasons only we have minimize the storage places and denominations available.

Figure 8:
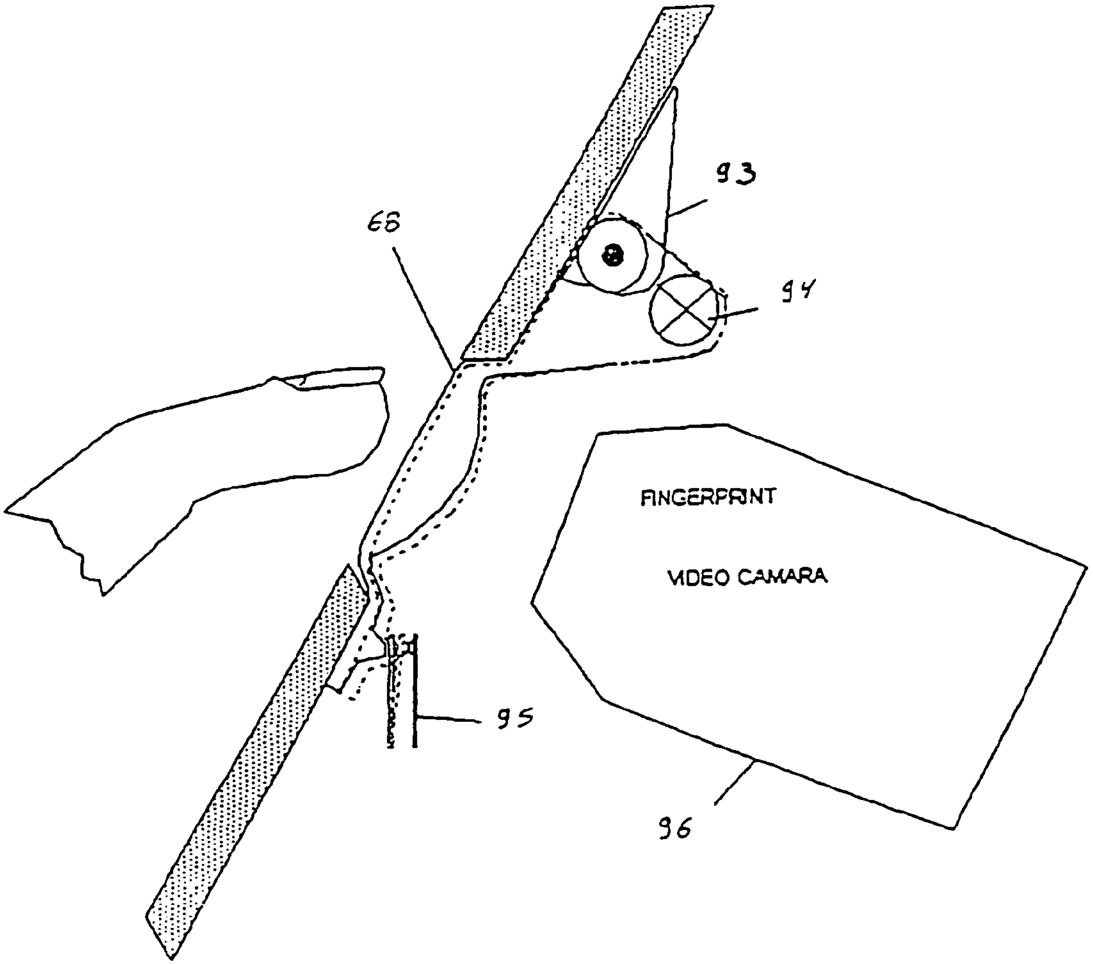
FIG. 8 is a conceptual illustration of a Video Fingerprinting System.

FIG. 8 shows a conceptual illustration of an exemplary embodiment of a typical Video Fingerprinting System.

The push button (68) is constructed by a transparent material shaped as a magnifying lens in his center. The push button (68) turning around axle (93) and is illuminated by the light source (94). With the press of the button, the switch (95) closes and triggers the logic of the system which puts into operation the digital camera (96).

It is obvious many other procedures, schemes and mechanisms can be employed for the recording of the fingerprint but we chose this only for simplicity in this example.

FIG. 9 is a conceptual illustration of a video screen which contains the picture of the patron (98), the picture of his fingerprint, and certain data provided by the system, such as time, location, etc and from data which can be voluntarily provided by the client.

This screen can be stored in a memory if some reason appears, or can be discarded if the program decides to, so transmission time and memory can be saved.

Obviously, if the authorities deem appropriate the picture can be stored and analyzed for statistical purposes such as to find out how many men or women use the machine, what is the ages and the preferred time of operation etc.

It is obvious to those in the art that the mentioned programs, mechanisms and scenarios of this description is chosen only for their simplicity and many other available can be employed according to the needs of the application and of course the system can work as a "stand alone" or can be retrofitted to the existed or future developed systems.

What is claimed is:

1. A method for recognizing the authenticity of a document, the method employing a central processing unit connected in a data exchanging network and including the steps of:

scanning a document to obtain a digitized picture of the document;

from the digitized picture data, recognizing characters printed on the document;

generating an electronic identification (TAG) associated with the document providing information regarding the location of the document and the time of scanning the document to establish a historic file enabling the tracing of the document;

storing the recognized characters and electronic identification (TAG) in a local CPU;

comparing the recognized characters of the document and electronic identification (TAG) with previously stored information in the local CPU;

establishing a bi-directional communication link in the data exchanging network between the local CPU and the central processing unit; and updating all stored information in the local CPU with information received from the central processing unit.

2. The method of claim 1, wherein the data exchanging network includes mobile phones which are operatively connected to the Internet.

3. The method of claim 1, further comprising the step of exchanging emergency contact information in real time via the data exchanging network.

4. The method of claim 1, wherein each of said steps are carried out at a plurality of different locations, all of which are connected in the data exchanging network.

5. The method of claim 1, wherein the document is paper money.

6. The method of claim 5, wherein the optically recognized characters and the stored characters are serial numbers of the paper money.

7. The method of claim 6, further comprising the step of perforating the paper money when the paper money is determined to be non-authentic.

8. The method of claim 1, further comprising the step of updating information collected in the central processing unit at predetermined time intervals.

9. The method of claim 8, wherein the updated information includes lists of wanted serial numbers of paper money.

10. The method of claim 1, further comprising the step of receiving, digitizing, comparing, and processing the fingerprint and photograph of a user.

11. The method of claim 1, wherein the step of recognizing characters is performed using optical character recognition (OCR) software.

12. The method of claim 1, wherein the communication link is a wireless link.

13. The method of claim 1, wherein the step of updating is performed at predetermined time intervals.

14. A currency validation system, comprising:

a central processing unit connected in a data exchanging network;

scanning means for obtaining a digitized picture of the currency;

a software program for optically recognizing characters printed on the currency;

means for generating an electronic identification (TAG) associated with the currency providing information regarding the location of the currency and the time of scanning the document to establish a historic file for enabling the tracing of the currency;

means for storing the recognizable characters of the document and electronic identification (TAG) in a local CPU;

means for comparing the recognizable characters and electronic identification (TAG) with previously stored information in the local CPU;

means for establishing a bi-directional communication link in the data exchanging network between the local CPU and the central processing unit; and means for updating all stored information in the local CPU with information received from the central processing unit.

15. The system of claim 14, further comprising light means that can identify and read watermark icons and digitize the icons and compare the icons stored in memory.

16. The system of claim 14, further comprising: means to transmit and receive ultraviolet light (UV); and a logic analysis program to analyze and process the results.

17. The system of claim 14, wherein the system includes a currency counting means and currency storage means.

18. The system of claim 17, further comprising means to print serial numbers of the currency on a security tape.

19. The system of claim 17, wherein the counting and storage means form part of a drawerless cash register.

20. The system of claim 14, further comprising logic program means to read and recognize utility bills and logic means to recognize bills to be paid, and means for paying the bills.

21. The system of claim 14, further comprising means for receiving, digitizing, comparing and processing of fingerprints and photographs of an operator of the system.

22. The system of claim 14, wherein the means for updating updates stored information in the local CPU at predetermined time intervals.

* * * * *